United States Patent [19]
Panitz et al.

[11] Patent Number: 5,409,543
[45] Date of Patent: Apr. 25, 1995

[54] DRY SOLDERING WITH HOT FILAMENT PRODUCED ATOMIC HYDROGEN

[75] Inventors: Janda K. G. Panitz, Edgewood; James L. Jellison, Albuquerque; David J. Staley, Los Lunas, all of N. Mex.

[73] Assignee: Sandia Corporation, Albuquerque, N. Mex.

[21] Appl. No.: 994,793

[22] Filed: Dec. 22, 1992

[51] Int. Cl.6 .................. C03C 23/00; C23G 1/00; F27B 11/00; B23K 1/20
[52] U.S. Cl. ................................ 134/2; 219/388; 219/85.1; 228/205
[58] Field of Search ........... 219/388, 85.1, 78.14; 228/220, 205, 206; 134/2, 1; 148/634, 625; 55/DIG. 1

[56] References Cited

U.S. PATENT DOCUMENTS

| | | | |
|---|---|---|---|
| 3,649,803 | 3/1972 | Desmond et al. | 219/388 |
| 4,452,642 | 6/1984 | Dietz et al. | 134/2 |
| 4,863,561 | 9/1989 | Freeman et al. | 134/1 |
| 5,000,819 | 3/1991 | Pedder et al. | 134/1 |
| 5,069,380 | 12/1991 | Deambrosio | 219/388 |
| 5,158,224 | 10/1992 | Baker et al. | 219/388 |
| 5,192,582 | 3/1993 | Liedke et al. | 228/206 |

FOREIGN PATENT DOCUMENTS

| | | | |
|---|---|---|---|
| 10530 | 2/1908 | Denmark | 134/2 |
| 1521989 | 2/1970 | Germany. | |
| 1621650 | 6/1971 | Germany. | |
| 51-126939 | 11/1976 | Japan. | |
| 1-287288 | 11/1989 | Japan. | |
| 2-89313 | 3/1990 | Japan. | |
| 4-127529 | 4/1992 | Japan. | |

*Primary Examiner*—John A. Jeffery
*Attorney, Agent, or Firm*—George H. Libman; Timothy D. Stanley

[57] ABSTRACT

A system for chemically transforming metal surface oxides to metal that is especially, but not exclusively, suitable for preparing metal surfaces for dry soldering and solder reflow processes. The system employs one or more hot, refractory metal filaments, grids or surfaces to thermally dissociate molecular species in a low pressure of working gas such as a hydrogen-containing gas to produce reactive species in a reactive plasma that can chemically reduce metal oxides and form volatile compounds that are removed in the working gas flow. Dry soldering and solder reflow processes are especially applicable to the manufacture of printed circuit boards, semiconductor chip lead attachment and packaging multichip modules. The system can be retrofitted onto existing metal treatment ovens, furnaces, welding systems and wave soldering system designs.

23 Claims, 1 Drawing Sheet

DRY SOLDERING WITH HOT FILAMENT PRODUCED ATOMIC HYDROGEN

The United States Government has rights in this invention pursuant to Contract No. DE-AC04-76DP00789 between the Department of Energy and American Telephone and Telegraph Company.

BACKGROUND OF THE INVENTION

1. Field of the Invention

This invention relates to a system for transforming metal surface oxides to metal. More particularly, this invention relates to a system for preparing metal surfaces for dry soldering and solder fellow processes.

2. Description of the Prior Art

Dry soldering and solder fellow processes, in general, can be used as alternatives to solder processes where wet fluxes are used. These dry processes are compatible with vacuum and controlled ambient processing technologies used for soldering electronic components. Dry soldering and solder reflow processes are especially, but not exclusively applicable to the manufacture of printed circuit boards, semiconductor chip lead attachment and packaging multichip modules. For these applications, it is desirable to minimize potentially corrosive residue by-products of the solder reflow process. In general, in any manufacturing process, safety, and environmental impact are of practical concern. Dry soldering and solder reflow processes can be tailored to self consistently fulfil these various concerns.

Dry soldering and dry solder reflow processes typically involve a reaction between a gas or vapor and a metal oxide that reduces the metal oxide and produces volatile oxide by-products which are removed by gaseous flow.

Prior work in the area of dry solder reflow has centered on the use of chemically reactive, halogen-containing gases such as $CF_2Cl_2$, $CF_4$, and $SF_6$. Such gases leave halide residues which can reduce solder bond strength and promote corrosion. In addition, gaseous halide compounds represent potential safety and environmental contamination problems. Halides can attack soldering system fixturing, the associated vacuum pumping system and organic compound substrates used for printed circuit boards.

Inductively coupled and capacitively coupled, direct current, audio frequency, radio frequency and microwave frequency gas plasmas can be used to produce reactive radicals with enhanced chemical reactivity for dry soldering and solder reflow processes. Such techniques are similar to commercial, plasma assisted reactive ion etching processes commonly used by the microelectronics community to fabricate integrated circuits. Such processes are flawed by the inherently diffuse nature of a plasma. The fundamental laws of the conduction of electricity through gases impose conditions on the size, shape and geometry of the electrodes and the walls of such systems and the temperature of the piece-part. It is difficult to localize and direct a plasma to the specific area where it is needed to solder small substrates. Many reactive gas plasmas attack fixturing in the vacuum chamber. If the plasma potential is not actively controlled, ions from the plasma will physically sputter material and/or give rise to space charge accumulation on electrically isolated surfaces. Physical sputtering and space charge accumulation can injure or destroy certain electronic components such as field effect transistors and capacitors.

A recent U.S. patent to Pedder et. al., U.S. Pat. No. 5,000,819, 1981, specifically describes a system employing atomic hydrogen produced in a microwave frequency plasma for the purposes of metal surface cleaning and dry solder reflow. Microwave systems with sufficient power to dissociate molecular hydrogen are relatively expensive, and represent potential safety problems associated with radiation leakage and eye damage arising from exposure to ultraviolet emissions from the plasma. Furthermore, microwave radiation can harm certain electronic components. Substrate temperature control can be a formidable problem in microwave plasma systems. In general, atomic hydrogen produced in a microwave plasma is characteristically distributed over a large area and not efficiently utilized. This lack of spatial control can lead to damage of peripheral areas on piece-parts that are not directly involved in the soldering process.

Other dry soldering and solder reflow approaches employ one or more lasers to heat the near-surface region of a metal with a layer of metal oxide, and thermally vaporize or ablate the oxide layer to prepare the material for soldering. Laser ablation is currently also of interest to the integrated circuit fabrication community as a lithographic technique. In general, it is believed that in addition to thermal vaporization, laser ablation processes also involve photo assisted desorption processes to some extent. Additional lasers may be used to heat the deoxidized metal to temperatures required to melt and flow the solder. A practical laser ablation dry solder reflow process typically requires a controlled ambient with an inert gas such as argon or a reducing gas such as nitrogen and/or hydrogen to inhibit reoxidation of the native metal surface by residual contaminants or by vaporized oxide compounds. Ambient control is necessary to expand the process window and frame workable limits. Otherwise, the characteristically low melting point and boiling-point of a metal vs. its metal oxide make laser ablation an extremely delicate process. A laser ablation dry solder fellow process is constrained by a number of considerations. Lasers are relatively expensive and relatively inefficient. In order for this technique to work there must be a clear line of sight between the laser and the part which means the (1) the solder must be deoxidized and mechanically placed on the deoxidized metal surface in separate operations and (2) the window into the controlled ambient system and associated optics in the system must be kept clean of condensed reaction by-products.

SUMMARY OF THE INVENTION

The present invention relates to a system that employs one or more hot, refractory metal filaments, grids or surfaces to thermally dissociate molecular species in a low pressure of a working gas to produce reactive species that can be used to chemically reduce metal oxides and form volatile oxide compounds that are removed in the working gas flow. The present invention further relates to a system employing such reactive species to prepare metal surfaces for dry soldering and solder reflow processes, The inventive system can be retrofitted onto existing metal treatment oven, furnace, welding system and wave soldering system designs to provide more versatile, flexible, economical, safer and otherwise expanded capabilities.

An object of the invention is to provide a process for chemically transforming or reducing metal surface oxides to metal.

A further object of the invention is to provide a system for chemically transforming or reducing metal surface oxides to metal employing reactive species.

A still further object of the invention is to provide a system for chemically transforming or reducing metal surface oxides with reactive species which employs one or more hot, refractory metal filaments, grids or surfaces to thermally dissociate molecular species to form said reactive species located in the vicinity of the metal surface.

A still further object of the invention is to provide a system for chemically transforming or reducing metal surface oxides with reactive species which is useful in preparing metal surfaces for dry soldering and solder reflow processes.

Additional objects, advantages, and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the forgoing and other objects, and in accordance with the purpose of the present invention, as embodied and broadly described herein, the present invention may comprise: (a) a deoxidation chamber; (b) means for maintaining a vacuum in said deoxidation chamber; (c) means for introducing a hydrogen-containing gas into said deoxidation chamber; (d) a filament located in said deoxidation chamber in the vicinity of said metal oxide surface, and (e) means for maintaining said filament at such an elevated temperature as to induce a substantial portion of the hydrogen in said hydrogen-containing gas to form atomic hydrogen so as to form reactive species.

BRIEF DESCRIPTION OF THE DRAWING

The accompanying drawing, which is incorporated in and forms part of the specification, illustrates an embodiment of the present invention and, together with the description, serves to explain the principles of the invention.

DETAILED DESCRIPTION OF THE INVENTION

Figure 1:
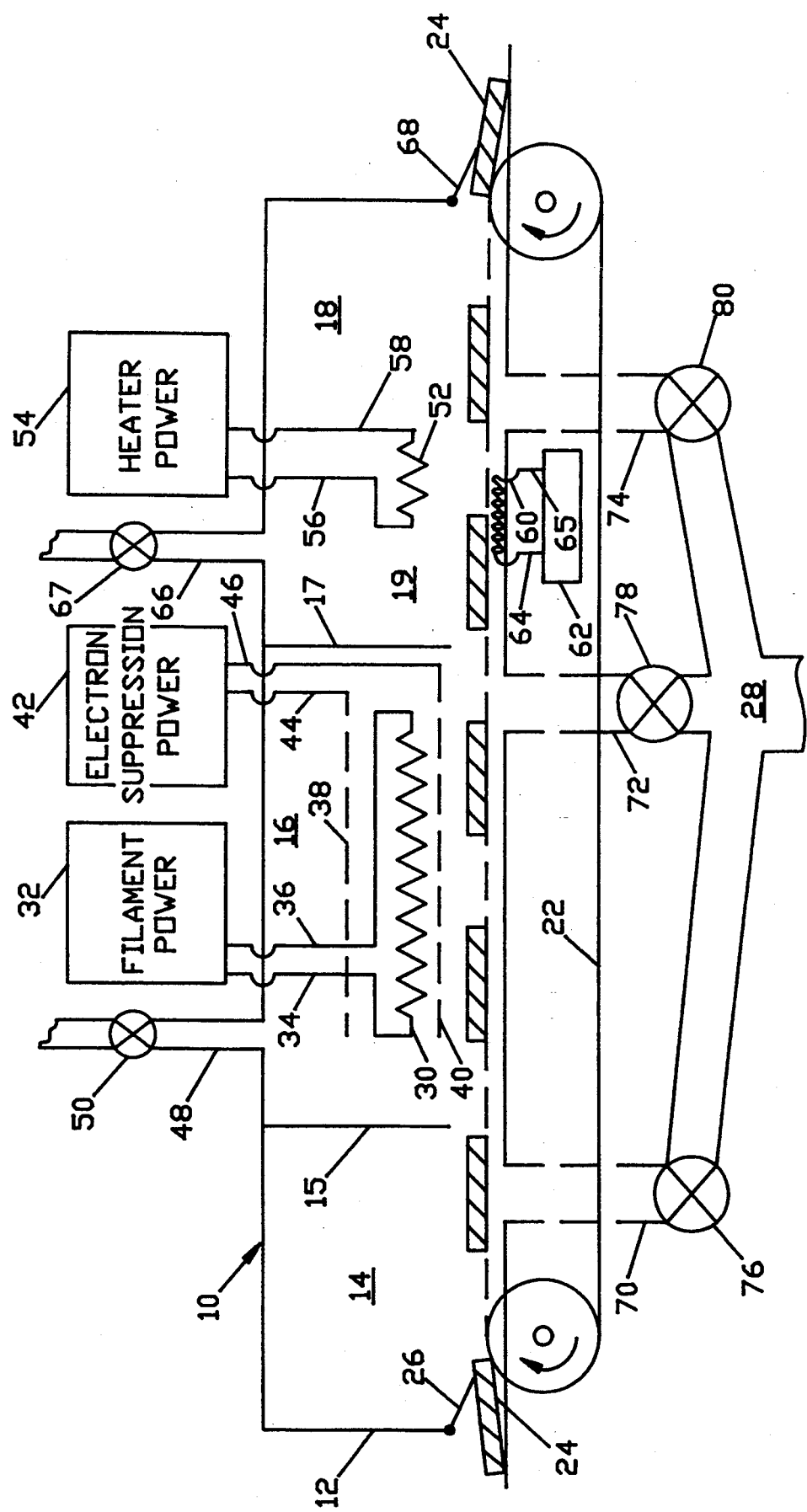
FIG. 1 is a schematic view in elevation of the continuous, dry soldering or solder reflow system of the present invention.

The present invention provides a system that employs one or more hot, refractory metal filaments, grids or surfaces to thermally dissociate molecular species in a low pressure of a working gas to produce reactive species that can be used to chemically reduce metal oxides and form volatile oxide compounds that are removed in the working gas flow. This system is particularly useful for carrying out dry soldering and solder reflow processes. This system could be retrofitted onto existing metal treatment oven, furnace, welding system and wave soldering system designs to provide more versatile, flexible, economical, safer and otherwise expanded capabilities.

An inherent advantage of the inventive hot filament system is that the filaments can be placed in a locally confined chamber, in the vicinity of the oxidized metal surface, so that the efficiency of the system can be maximized with a relatively low concentration of a potentially hazardous and expensive reactive gas species such as hydrogen. It is known that atomic hydrogen will recombine to form molecular hydrogen when it contacts and becomes "pinned" to a metal surface. If certain piece-part areas or fixtures must be protected from atomic hydrogen, this can be accomplished by placing metallic baffles which serve as hydrogen recombination sites at appropriate areas. This leads to the ability to control the spatial and temporal distribution of the active species. Consequently, the active species react only with the surfaces that are to be soldered.

Chemical reduction proceeds most rapidly in 10 Torr or more pure hydrogen. However, by suitable filament placement, nickel oxide, tin oxide, lead oxide, silver oxide and copper oxide can be reduced to metallic nickel, tin, lead, silver and copper respectively, in nonflammable concentrations of hydrogen, i.e. two to four percent hydrogen in nitrogen or argon etc., for exposure times that are consistent with loading piece-parts on a continuously moving belt for practical manufacturing situations. Because the species produced by this system have thermal energies (less than 5 eV) as compared to the higher energies of species in a plasma (20 eV and above), chemical erosion dominates over physical erosion; therefore with a judicious choice of fixturing material, fixturing attack is inconsequential. Hydrogen and nitrogen are particularly attractive working gas candidates from the standpoint of exhaust gas release and environment compatibility considerations. It is reported that atomic hydrogen attacks organic compounds(used as substrates for printed circuit boards) at substantially slower rates as compared to halide species. This potential problem is further reduced by the present invention by the localization of the most chemically active gas species.

Suitable refractory metal filaments that can be used effectively to dissociate reactive gases such as hydrogen include tungsten and rhenium. A number of filaments or a grid of filaments can be used to treat large shaped substrate areas.

Useful amounts of atomic hydrogen are produced at filament temperatures as low as 500 degrees C. Higher filament temperatures (1800 to 2200 degrees C.) can be used to increase atomic hydrogen concentration and speed the metal oxide reduction rate before progressing onto the soldering stage of piece-part processing. Solderability can be defined as achieving the desired spatial distribution of solder. The ability to manipulate solder flow to optimize its final spatial distribution is essential. Elevated filament temperature can be used to preheat or heat the piece-parts with radiant energy to temperatures appropriate for soldering operation (180 to 350 degrees C.). The filaments that participate in preheating or heating the substrates can be placed so that temperature differentials occur that promote solder flow. Alternatively, the parts can be tilted or mechanically moved at this stage to assist with promoting sufficient solder flow. Many types of alternative heat sources, such as ohmic resistive heaters, lasers, and inductive heating elements can be used in this system to heat the piece-parts to the melting temperature of the solder and form temperature differentials conducive to optimal solder flow. Locally increasing working gas pressure to from about 50 to 100 Torr reduces the surface tension of many molten solder alloys and promotes flow.

If the number of thermionic electrons emitted at elevated filament temperatures are sufficient to damage the piece-parts, they can be removed by installing an electrically positive-biased collection grid in the system and/or by biasing the vicinity around the parts negative.

Working gas pressures of 10 Torr or higher are appropriate for the operation or this system. At these pressures, reactive species undergo sufficient collisions to travel beneath sufficiently small, solder preforms placed on piece-parts before the piece-parts are loaded into the system. (A direct line of sight between the metal oxide and the filament is not necessary for chemical reduction to occur.) Alternatively, solder can be introduced to the surfaces being joined by a variety of conventional techniques employing solder wire or foil spool feeders, brush-on or extruded solder pastes and similar adaptations of other techniques currently used in commercial wave soldering systems.

Referring to FIG. 1, dry solder and solder fellow system 10 comprises vacuum chamber 12 having vacuum inlet lock chamber 14, deoxidation chamber 16, separated from vacuum inlet lock chamber 14 by wall 15, and vacuum outlet lock chamber 18, separated from deoxidation chamber 16 by wall 17, vacuum outlet lock chamber 18 comprising solder preform lead attachment stage 19 and cooling stage 20. Belt conveyor 22 moves piece-parts 24 through inlet lock 26 into vacuum inlet lock chamber 14. Vacuum is induced in vacuum chamber 12 through vacuum manifold 28. Hot filament grid 30 is located in deoxidation chamber 16 and is supplied electrical power from filament power source 32 through filament leads 34 and 36 and is located in the vicinity of conveyor 22 and piece-parts 24. Electrically positive-biased collection grid 38 is located above hot filament grid 30 and electrically negative-biased grid 40 is located below hot filament grid 30 in deoxidation chamber 16. Electron suppression power source 42 is connected to positive-biased collection grid 38 by positive lead 44 and to negative-biased grid 40 by means of negative lead 46. A working gas composed of hydrogen, or a hydrogen plus inert gas mixture is introduced into deoxidation chamber 16 through first working gas inlet line 48 by manipulation of first working gas inlet leak valve 50. For 100 percent hydrogen, from about 10 to 20 Tort of working gas is maintained in deoxidation chamber 16. For 2 percent hydrogen in inert gas by volume(nitrogen or argon) working gas is maintained at or below 100 Torr. Working gas compositions can be varied between 2 percent and 100 percent hydrogen as desired, with appropriate adjustment of working pressure.

Substrate heater 52 is located in outlet lock chamber 18 in the vicinity of conveyor 22 in solder preform and lead attachment stage 19 to supply heat for melting the solder on piece-parts 24. Heater power supply 54 is connected to substrate heater 52 by means of heater leads 56 and 58. An additional resistive heater 60 is located in the vicinity of conveyor 22 below piece-parts 24 as supported on conveyor 22 in solder preform and lead attachment stage 19, to supply additional heat to the process as required. Resistive heater power supply 62 is connected to resistive heater 60 by means of resistive heater leads 64 and 65. Working gas is introduced into outlet lock chamber 18 through second inlet line 66 controlled by second working gas inlet leak valve 67. Piece-parts 24, travelling on conveyor 22, exit vacuum outlet lock chamber 18 through outlet lock 68 after cooling in cooling stage 20. Vacuum lines 70, 72, and 74 lead to vacuum manifold 28 from vacuum inlet lock chamber 14, deoxidation chamber 16, and vacuum outlet lock chamber 18, respectively. Valves 76, 78, and 80 control the vacuum level in chambers 14, 16, and 18, respectively.

In operation, piece-parts 24 enter vacuum inlet lock chamber 14 through inlet lock 26 on conveyor 22. Piece-parts 24 travel by means of conveyor 22 into deoxidation chamber 16. Hydrogen gas or hydrogen-inert gas mixture is introduced into deoxidation chamber 16 by means of hydrogen inlet line 48 by manipulation of hydrogen inlet valve 50, where the hydrogen is converted into reactive species through exposure to hot filament grid 30. Hot filament grid 30 is made of a refractory metal filament such as tungsten or rhenium filaments. Filament temperatures of between 500 degrees C. and 2200 degrees C. are useful in producing reactive atomic hydrogen according to the invention. Hot filament grid 30 is heated by electrical power from filament power supply 32 through leads 34 and 36. Upon exposure of the piece-parts 24 to the reactive hydrogen species produced at hot filament grid 30, any metal oxide on their exposed surface are reduced to elemental metal and are thus prepared for the soldering process. Thermionic electrons emitted at elevated filament temperature from filament grid 30 are removed, if required, by operation of electrically positive-biased collection grid 38 and/or by biasing the vicinity around piece-parts 24 negative with negative-biased grid 40. Piece-parts 24 then travel into vacuum outlet lock chamber 18 where heat is applied by means of substrate heater 52 and resistive heater 60 in solder preform and lead attachment stage 19 to affect melting of solder on piece-parts 24 to accomplish the desired soldering or solder reflow process. The working gas pressure and composition in solder preform and lead attach stage 19 is adjusted to minimize molten solder surface tension, thus promoting flow. Piece-parts 24 then enter cooling stage 20 and, after desired cooling, exit vacuum outlet lock chamber 18 at outlet lock 68. Desired vacuum levels in chambers 14, 16, and 18 are maintained by manipulating valves 76, 78, and 80 in vacuum lines 70, 72, and 74, respectively, leading into vacuum manifold 28, and by manipulating the working gas inlet leak valves 50 and 67 in inlet lines 48 and 66, respectively.

Although the system as described above is particularly appropriate for producing atomic hydrogen for preparing metal surfaces for dry soldering and solder fellow processes for soldering electronic components, the cleaning process utilized could be adapted for other applications, such as solid state welding, and restoration of extensively oxidized metal surfaces with minimal material loss or damage.

Broad applicability to solder processes and other processes involving nascent metal surfaces could include simple batch processes. However, the preferred implementation of the concepts embodied in the inventive system is a fully automated, computer controlled, in-line production system. This would involve automated placement of all hardware, such as substrates and devices, automated spatial and temporal control of the introduction of reactive radical species for the purposes of reducing metal oxides and automated feeding, application and placement of solder materials. Laser heating sources may be especially applicable to such systems because of the high degree of computer control. By way of example, application of this invention to printed circuit board assembly involving both thru-hole technology and surfacemount technology would proceed as follows. A metal oxide reduction chamber with appropriate hot filaments for local production of reactive species such as atomic hydrogen, metal baffled to constrain the reactive species to areas where they are specifically required and additional baffles to control working gas pressure, flow and the removal of volatile oxide by-products could be retrofitted onto existing wave soldering machines to replace existing metal oxide removal stages. Existing components employing conventional technology on these machines, such as pick and place circuit board manipulators, lead placement and solder placement mechanisms, and components regulating solder melting and flow would be retained.

The present invention is further illustrated by the following examples:

EXAMPLE 1

Ambient Oxide Removal, Solder Wetting and Flow. Ambient metal oxides were removed from samples of copper, tin-plated copper and nickel by placing these samples in the dry solder reflow system on a horizontal plane acting as a support and spaced 1.5 inches from a 0.030 inch diameter rhenium filament. The system is then closed and pumped down to background pressure in the low $10^{-6}$ Torr range; 20 Torr of UHP hydrogen is then leaked into the system at a flow rate of approximately 100 sccm. The filament is then heated to a temperature of 1500 degrees C. for approximately five minutes. For the geometry and dimensions used, this filament is sufficient to produce adequate atomic hydrogen and reduce copper, tin and nickel oxide at distances of 2.5 inches from the filament. If $0.5 \times 0.125 \times 0.005$ inch pieces of 50% Pb-50% Sn solder preform sheet are placed on the oxidized metals, the heat radiated by the filament is not sufficient to melt the solder preforms, however. After ambient oxide reduction, the solder preforms can be melted by raising the filament temperature to 1900–2000 degrees C.

Alternatively, the solder preforms can be melted by raising the temperature of one end of the metal samples to approximately 300 degrees C. (while the other end of the metal samples are held at approximately 140 degrees C. by the high thermal conductivity of the low pressure of hydrogen gas) and increasing the filament temperature to 1900 degrees C. By using this latter mode of operation, solder flow and spreading across the surface of a metal is promoted by the temperature differential over the metal surface.

Solder flow can be promoted by reducing the surface tension of the molten solder by leaking from about 40 to 50 Torr of a 2% hydrogen-98% nitrogen mixture into the system after oxide removal.

EXAMPLE 2

The Removal of an Extremely Thick Layer of Copper Oxide. An extremely thick, black layer of copper oxide (formed by heating copper to a temperature of 300 degrees C. for approximately 20 hr. in laboratory air) was removed by placing the oxidized copper on a platform 1.5 inches from a 0.030 inch diameter rhenium filament in a vacuum system. The system is closed and pumped down to a background pressure in the low $10^{-6}$ Torr range; 10 Torr of 2 percent UHP hydrogen plus 98 percent UHP nitrogen is subsequently leaked into the system at flow rates of approximately 2 sccm hydrogen, 98 sccm nitrogen. The filament is then heated to a temperature of 2150 degrees C. for approximately ten minutes. For the geometry and dimensions used, radiant heat from the filament causes the temperature of the oxidized copper to increase from ambient to approximately 150 plus or minus 10 degrees C. During this time, the transformation from a black copper oxide to metallic copper can be visually observed. In order to minimize the amount of copper oxide that forms on the surface of the metal after it is introduced to lab air, it is best to allow the metal to cool to a temperature below 40 degrees C. in the hydrogen and nitrogen mixture before venting the vacuum system.

The particular sizes and equipment discussed above are cited merely to illustrate a particular embodiment of this invention. It is contemplated that the use of the invention may involve components having different sizes and shapes as long as the principle, the employment of a hot filament to form reactive atomic hydrogen from a hydrogen-containing gas and employing the reactive atomic hydrogen to reduce a metal oxide surface such as in the preparation of a metal surface for dry solder or solder reflow processes, is followed. The invention contemplates other derivative configurations and process steps such as the batch reduction of metal oxide surfaces in preparation for dry soldering, solder reflow, or other processes. It is intended that the scope of the invention be defined by the claims appended hereto.

We claim:

1. A system for the dry reduction of a metal oxide surface of a piece part comprising:
   a deoxidation chamber;
   means for maintaining a vacuum in said deoxidation chamber;
   means for introducing a hydrogen-containing gas into said deoxidation chamber, said gas containing no more than about 4% by volume hydrogen in inert gas;
   a support for said piece-part;
   a filament located in said deoxidation chamber in the vicinity of said support;
   means for maintaining said filament at such an elevated temperature as to induce a substantial portion of the hydrogen in said hydrogen-containing gas to form atomic hydrogen so as to form reactive species; and
   an electrically positive-biased collection grid located in the vicinity of said filament so as to trap thermionic electrons emitted at elevated filament temperatures.

2. The system of claim 1, wherein said elevated temperature is within the range of from 500 degrees C. and 2200 degrees C.

3. The system of claim 1, further comprising means for maintaining said hydrogen-containing gas at about 10 Torr absolute pressure within said deoxidation chamber.

4. The system of claim 1, wherein said filament is composed of a metal selected from the group comprising tungsten and rhenium.

5. The system of claim 1, wherein said filament is in the form of a grid.

6. The system of claim 1, wherein the vertical distance between said filament and said support is about 1.5 inches.

7. A system for the dry reduction of a metal oxide surface of a piece part comprising:
   a deoxidization chamber;
   means for maintaining a vacuum in said deoxidation chamber;

means for introducing a hydrogen-containing gas into said deoxidation chamber, said gas containing no more than about 4% by volume hydrogen in inert gas;

a support for said piece-part;

a filament located in said deoxidation chamber in the vicinity of said support;

means for maintaining said filament at such an elevated temperature as to induce a substantial portion of the hydrogen in said hydrogen-containing gas to form atomic hydrogen so as to form reactive species; and an electrically negative-biased repulsion grid located in the vicinity of said metal oxide surface so as to repel thermionic electrons emitted at elevated filament temperatures.

8. The system of claim 6, wherein the vertical distance between said filament and said support is about 1.5 inches.

9. The system of claim 6 wherein said filament is in the form of a grid.

10. A method for the dry reduction of a metal oxide surface comprising the steps of:

placing a piece-part having said metal oxide surface on a support in a deoxidation chamber;

maintaining an atmosphere of a hydrogen-containing gas in said deoxidation chamber under partial vacuum conditions at or below 100 Torr pressure, said gas containing about 2% by volume hydrogen in inert gas;

maintaining a filament in the vicinity of said metal oxide surface, said filament being maintained at an elevated temperature such that a substantial portion of the hydrogen in said hydrogen-containing gas is formed into atomic hydrogen so as to form reactive species;

contacting said metal oxide surface with said reactive species; and removing products of reduction of said metal oxide surface from the vicinity of said piece-part.

11. The method of claim 10, wherein said filament is maintained at a temperature in the range of 500 degrees C. and 2200 degrees C. by supplying electrical power to said filament.

12. The method of claim 10, further comprising maintaining an electrically positive-biased collection grid in the vicinity of said filament so as to trap thermionic electrons emitted at elevated filament temperatures.

13. The method of claim 10, further comprising maintaining an electrically negative-biased repulsion grid in the vicinity of said piece part so as to repel thermionic electrons emitted at elevated filament temperatures.

14. The method of claim 10, wherein said filament is maintained at a vertical distance of about 1.5 inches of said metal oxide surface.

15. In a continuous soldering and solder reflow system having an inlet vacuum lock chamber with an inlet lock, and outlet vacuum lock chamber with an outlet lock and housing a solder preform and lead attachment stage and a cooling stage, a conveyor for moving piece-parts through the sequence of said inlet lock, said inlet vacuum lock chamber, said solder preform and lead attachment stage, said cooling stage and said outlet lock, said solder preform and lead attachment stage including heating means for melting solder, and a vacuum manifold connected to said inlet vacuum lock chamber and said outlet vacuum lock chamber, the improvement comprising:

(a) a deoxidation chamber located between said inlet vacuum lock chamber and said solder preform and lead attachment stage of said outlet vacuum lock chamber and connected to said vacuum manifold;

(b) means for maintaining a vacuum in said deoxidation chamber;

(c) means for introducing a hydrogen-containing gas into said deoxidation chamber, said gas containing no more than about 4% by volume hydrogen in inert gas;

(d) a filament located in said deoxidation chamber in the vicinity of said conveyor and a metal oxide surface of said piece-parts as they travel on said conveyor; and (e) means for maintaining said filament at such an elevated temperature as to induce a substantial portion of the hydrogen in said hydrogen-containing gas to form atomic hydrogen so as to form reactive species.

16. The system of claim 15, wherein said elevated temperature is maintained within the range of from 500 degrees C. and 2200 degrees C.

17. The system of claim 16, further comprising means for maintaining said hydrogen-containing gas at about 10 Torr absolute pressure in said deoxidation chamber.

18. The system of claim 17, wherein said filament is composed of a metal selected from the group comprising tungsten and rhenium.

19. The system of claim 18, wherein said filament is in the form of a grid.

20. The system of claim 19, further comprising an electrically positive-biased collection grid located in the vicinity of said filament so as to trap thermionic electrons emitted at elevated filament temperatures.

21. The system of claim 20, further comprising an electrically negative-biased grid located in the vicinity of said metal oxide surface so as to repel thermionic electrons emitted at elevated filament temperatures.

22. The system of claim 21, further comprising means for introducing a hydrogen-containing gas into said outlet vacuum lock chamber at said solder preform and lead attachment stage for maintaining a pressure in said stage above that in said deoxidation chamber.

23. The system of claim 15, wherein the vertical distance between said filament and said conveyor is about 1.5 inches.

* * * * *